US006088734A

United States Patent [19]

Marin et al.

[11] Patent Number: 6,088,734
[45] Date of Patent: Jul. 11, 2000

[54] SYSTEMS METHODS AND COMPUTER PROGRAM PRODUCTS FOR CONTROLLING EARLIEST DEADLINE FIRST SCHEDULING AT ATM NODES

[75] Inventors: Gerald A. Marin, Chapel Hill; Raif O. Onvural, Cary; Allen Leonid Roginsky, Durham; Vijay Srinivasan, Cary, all of N.C.

[73] Assignee: International Business Machines Corporation, Armonk, N.Y.

[21] Appl. No.: 08/968,201

[22] Filed: Nov. 12, 1997

[51] Int. Cl.[7] .................................................. G06F 15/16
[52] U.S. Cl. ............................ 709/232; 709/235; 370/230
[58] Field of Search .................................... 709/203, 217, 709/218, 223, 232, 235; 370/229, 254, 230, 232; 340/825.01, 825.03

[56] References Cited

U.S. PATENT DOCUMENTS

| | | | |
|---|---|---|---|
| 5,390,184 | 2/1995 | Morris | 370/353 |
| 5,392,286 | 2/1995 | Tanaka et al. | 370/231 |
| 5,416,769 | 5/1995 | Karol | 370/414 |
| 5,428,616 | 6/1995 | Field et al. | 370/253 |
| 5,483,522 | 1/1996 | Derby et al. | 370/54 |
| 5,533,020 | 7/1996 | Byrn et al. | 370/395 |
| 5,559,798 | 9/1996 | Clarkson et al. | 370/468 |
| 5,771,234 | 6/1998 | Wu et al. | 370/396 |
| 5,784,357 | 7/1998 | Wolker et al. | 370/218 |
| 5,844,890 | 12/1998 | Delp et al. | 370/230 |
| 5,886,980 | 3/1999 | Zheng | 370/230 |
| 5,909,443 | 6/1999 | Fichou et al. | 370/412 |

OTHER PUBLICATIONS

Liang, S.T., "Realization of earliest–due–date scheduling discipline for ATM switches" IECE Transations on Communicating, Abstract 1998.

*Primary Examiner*—Zarni Maung
*Assistant Examiner*—Jason D. Cardone
*Attorney, Agent, or Firm*—Gerald R. Woods; Myers Bigel Sibley & Sajovic, P. A.

[57] ABSTRACT

Methods, systems and computer program products for controlling scheduling in an ATM node in a network are provided which aggregate connection information for connections to the ATM node to provide a set of aggregate connection information for the ATM node. The set of aggregate connection information is distributed to other ATM nodes in the network and may be used in accepting connections to the ATM network based on the aggregate connection information. Scheduling may be provided by associating a timestamp value in each cell associated with an accepted connection as it is received by the ATM node. Received cells are grouped into a plurality of cell groups in timestamp order based upon characteristics of the cells and cells are selected from each group so as to transmit the cells in earliest deadline first order.

35 Claims, 8 Drawing Sheets

SYSTEMS METHODS AND COMPUTER PROGRAM PRODUCTS FOR CONTROLLING EARLIEST DEADLINE FIRST SCHEDULING AT ATM NODES

FIELD OF THE INVENTION

The present invention relates generally to communications networks and more particularly to communications networks using Asynchronous Transfer Mode (ATM).

BACKGROUND OF THE INVENTION

Asynchronous Transfer Mode (ATM) networks have become increasingly popular for both wide area networks and local area networks. In an ATM network all information is transported through the network in relatively short blocks called cells. Information flow through the network is along paths called virtual channels which are set up as a series of pointers through the network. Cells on a particular virtual channel always follow the same path through the network and are delivered to the destination in the order in which they are received.

When communications are initiated in an ATM network a request is made for a connection. As part of the connection request, the quality of service (QoS) of the request is specified by the requestor. Quality of service characteristics which may be specified in ATM include cell transfer delay (network latency), cell delay variation (jitter), cell transfer capacity (average and peak allowed rates), cell error ratio, cell loss ratio and cell misinsertion ratio. These QoS parameters are used by the ATM nodes to determine the route of the connection and in determining allowable node utilization.

Routing in an ATM network is performed by an ATM node which attempts to predict the route for a virtual connection from a source to a destination. An ATM connection is not set up unless and until the network determines that there is sufficient capacity for the new connection. This determination is based upon the characteristics of the network, the existing traffic on the network and the requested QoS for the connection. If the requested QoS cannot be provided then the requested connection is not accepted. The function in ATM which determines whether a connection request is accepted is referred to as call admission control (CAC). In ATM, the CAC function is typically carried out at two places; the entry point into the ATM network and at each node in the connection path.

At the entry point into the ATM network a process called Generic Call Admission Control (GCAC) determines a probable route for the connection request based on the QoS requested, and either accepts or rejects the request based on this determination. To perform the GCAC function, the entry point should have available information about the utilization of the other nodes in the ATM network. This information may then be utilized to determine if the nodes along the selected route can satisfy the QoS requirements of the requested connection.

At each node in a connection route, a local call admission control function, called an Actual Call Admission Control (ACAC), determines if the node will accept the connection request. This ACAC function utilizes the requested QoS and information about the existing connections through the node to determine if the requested QoS level may be achieved. If so, the connection request is accepted.

To have sufficient information to perform the GCAC function at each possible entry point, each node in the network broadcasts information about each connection at the node. This information typically includes information sufficient to determine the traffic envelope for a connection (i.e. the maximum amount of traffic a connection is allowed to send in time). Information sufficient to calculate the traffic envelope for a connection includes the peak data rate for the connection, the maximum burst size, the maximum sustained data rate and the guaranteed delay. From this information, the node may perform a "schedulability" to determine if the nodes in the proposed route will probably accept the requested connection.

While the GCAC function may provide increased performance in routing, one drawback is the increase in overhead associated with broadcasting connection information over the ATM network to each node for each connection. As the number of connections at a node increase the amount of overhead for broadcasting connection information increases. With a large number of connections, significant amounts of bandwidth of a network may be consumed with connection data transmissions from node to node.

In an effort to ensure that accepted connections provide the requested quality of service criteria for a connection, ATM nodes may utilize an Earliest Deadline First (EDF) scheduler to select the order in which cells are transmitted over a physical link of the network. The EDF scheduler prioritizes cells on a physical link based upon the time until the maximum delay time through the node of the cell expires. By transmitting the cells with the least time left until the maximum delay time expires, the likelihood of making the maximum delay criteria is increased. However, such scheduling may require significant processing. For example, all cells in the system may be queued but then all cells must be searched for the shortest deadline. Alternatively, maintenance of a single sorted queue of all the cells in the system would require log N operations to insert a cell in the queue, where N is the number of cells in the queue.

Whatever system of scheduling cells to meet the maximum delay requirements is utilized, congestion conditions may still result in the ATM network. In an ATM network, congestion control is provided by discarding cells until the congestion problem is relieved. To facilitate minimizing the disruption caused by such discarding of cells, a cell may be marked as a low priority cell. Low priority cells would be the first cells to be discarded to relieve a congestion problem. FIG. 1 illustrates the configuration of a cell in ATM. As seen in FIG. 1, the cell loss priority bit (CLP) may be set to indicate that the cell may be discarded. This ability to prioritize cells to be discarded may further complicate an EDF scheduler as the scheduler should also take into account whether a cell with a short deadline is a low priority cell and whether higher priority cells are waiting to be transmitted.

In light of the above discussion, a need exists for improvements in the mechanisms for accepting connections and for scheduling transmission of cells for accepted connections in ATM networks.

SUMMARY OF THE INVENTION

In view of the above discussion, it is an object of the present invention to provide for decreased overhead in the determination of a CAC function in an ATM network.

Yet another object of the present invention is to reduce the number of broadcasts of data between ATM cells.

Still another object of the present invention is to disassociate the overhead of performing the CAC function from the number of connections through a node in the ATM network.

A further object of the present invention is to provide efficient utilization of ATM resources in scheduling cells for transmission.

Still another object of the present invention is to reduce the number of operations required to schedule cells in an earliest deadline first manner.

Another object of the present invention is to schedule cells for transmission such that congestion conditions do not disrupt the transmission of cells.

These and other objects of the present invention are provided by methods, systems and computer program products for distributing connection information between ATM nodes in a network by aggregating connection information for connections to an ATM node to provide a set of aggregate connection information for the ATM node. This set of aggregate connection information may then be distributed to other ATM nodes in the network. Preferably, the connection information includes peak data rate, maximum burst size and maximum sustainable data rate. An ATM node may determine whether to accept a requested connection based upon the aggregate connection information of the ATM node and the connection information of the requested connection.

The aggregation and distribution of connection information may be achieved by aggregating connection information for connections in each connection class of the ATM node so as to provide a set of aggregate connection information for each connection class of the ATM node. Each set of aggregate connection information for each connection class of the ATM node may then be distributed to other ATM nodes in the network.

By utilizing aggregate connection information, the amount of data which is broadcast to the network to facilitate the CAC function may be reduced. Rather than every connection broadcasting data, only classes of connections broadcast data. As there are typically substantially fewer classes of connections than connections, a substantial reduction in data and traffic may be achieved. Furthermore, traditional broadcasts of connection information, the amount of data broadcast utilizing the present invention is not with a function of the number of connections but is instead a function of the number of connection classes. Thus, the only increases in the amount of data broadcast result from increasing the number of connection classes. By fixing the number of connection classes, the amount of broadcast data may be limited and the amount of overhead for the network associated with broadcasts of connection information controlled.

Aggregate connection information may be obtained by determining the connection class of each connection through the ATM node and summing the connection information for each connection in a connection class to provide the aggregate connection information for the connection class. Connection classes may include constant bit rate connections, real-time variable bit rate connections, non-real-time variable bit rate connections, available bit rate connections and unspecified bit rate connections. The present invention also includes methods, systems and computer program products for scheduling ATM cells from different connections at an ATM node in earliest deadline first order. Such methods, systems and computer program products may be used individually or in cooperation with the above described aggregation embodiments of the present invention for further benefits. The scheduling aspects of the present invention schedule ATM cells by associating a timestamp value with each cell as it is received by the ATM node. These timestamp values are compared to determine the cell with the lowest timestamp value which is typically scheduled as the first cell to transmit. The timestamp may be the sum of the arrival time of the cell and the delay guarantee of the cell. After scheduling, the received cells may be transmitted to other ATM nodes in the order the cells are scheduled.

In a particular embodiment of the present invention, the scheduling of ATM cells includes providing a plurality of high priority first-in-first-out (FIFO) buffers and a plurality of low priority FIFO buffers. In such a case each low priority FIFO buffer has a corresponding high priority FIFO buffer. A main queue FIFO buffer is also provided. Received cells are evaluated to determine whether the received cell is a high priority cell or a low priority cell. Received cells are then distributed to a FIFO buffer associated with the received cell, wherein the received cell is stored in a low-priority FIFO buffer if the received cell is a low priority cell and stored in a high-priority FIFO buffer if the received cell is a high priority cell. The first cell in each high priority FIFO buffer is then extracted from the plurality of high priority FIFO buffers and stored in the main queue FIFO buffer. This extraction is repeated until all high-priority FIFO buffers no longer contain cells.

By placing cells in FIFO buffers as they are received the cells are placed in earliest deadline first order within a FIFO. Thus, by extracting the cells from the individual FIFO buffers associated with the cells into a main buffer the cells may be sequenced in an earliest deadline first order. Such an operation relies on the FIFO nature of the buffers to sequence the cells without the need for numerous operations.

After all of the high priority buffers are empty, the first cell is extracted from the plurality of low priority FIFO buffers and stored in the main queue FIFO buffer if the timestamp of the cell indicates that the deadline for the cell has not passed and that the timestamp of the cell is later than the last cell stored in the main queue from the high priority FIFO buffer corresponding to the low priority FIFO buffer from which the cell was extracted. In such a manner, the low priority cells are not placed out of sequence in the ATM network. Low priority cells which do not meet the criteria for storage in the main queue may be discarded.

In a further embodiment of the present invention, it is determined if the high priority FIFO buffer associated with a received high priority cell is full. In such a case, the received high priority cell may be stored in the low priority FIFO buffer associated with the received high priority cell.

In particular embodiments of the present invention, the FIFO buffers are associated with received cells based upon the virtual connection of the received cells. In such an embodiment a high priority FIFO buffer is provided corresponding to each earliest deadline first virtual connection associated with the ATM node Corresponding low priority FIFO buffers are also provided for each earliest deadline first virtual connection associated with the ATM node.

In another embodiment of the present invention, the FIFO buffers are associated with received cells based upon a delay class associated with the received cells. In such an embodiment a high priority FIFO buffer is provided corresponding to each delay class associated with the ATM node. Corresponding low priority FIFO buffers are also provided for each delay class associated with the ATM node.

As will be appreciated by those of skill in the art, the present invention may be embodied as methods, apparatus or computer program products.

DETAILED DESCRIPTION OF THE INVENTION

Figure 1:
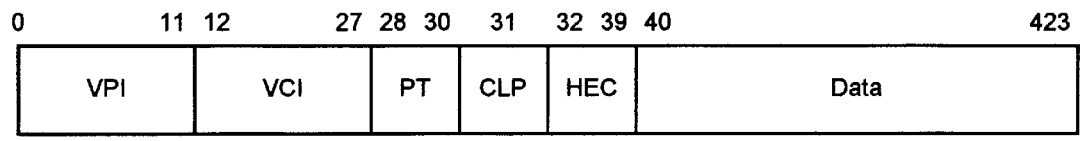
FIG. 1 is a block diagram illustrating a typical ATM cell.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Operations for various aspects of the present invention are illustrated herein in flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 2:
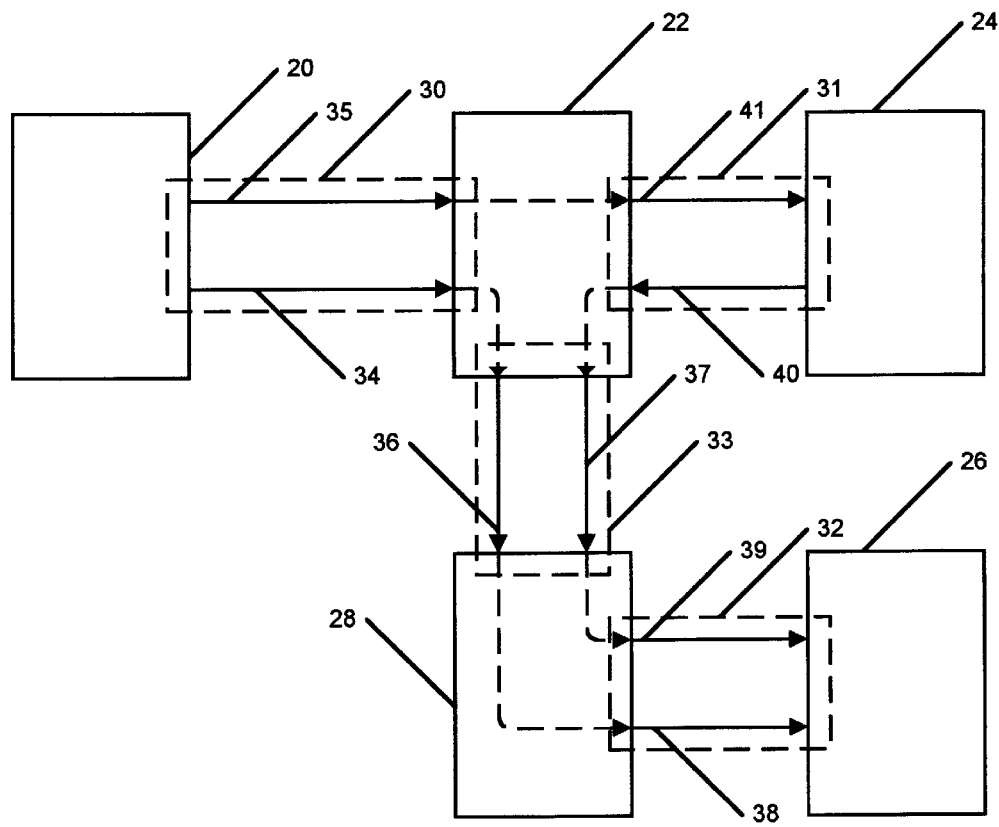
FIG. 2 is a block diagram schematically illustrating an ATM network utilizing the present invention.

FIG. 2 illustrates a network utilizing ATM nodes according to the present invention. As seen in FIG. 2, a number of ATM nodes 20, 22, 24, 26 and 28, are interconnected via physical links 30, 31, 32 and 33. The physical links provide for communication between the nodes and allow for the interconnection of ATM nodes by multiple virtual connections to provide paths from one node to another. The virtual connections in FIG. 2 are illustrated as connections 34, 35, 36, 37, 38, 39, 40 and 41.

As an example of a path between nodes 20 and 26, node 20 may make a virtual connection to node 26 utilizing virtual connection 34 over physical link 30 which connects node 20 to node 22. Node 22 then connects to node 28 utilizing virtual connection 36 over physical link 33. Node 28 then utilizes virtual connection 38 over physical link 32 to connect to node 26. The route of virtual connection 34 to virtual connection 36 to virtual connection 38 will then be utilized as the connection from node 20 to node 26 for all cells for the requested connection.

As will be appreciated by those of skill in the art, the nodes of FIG. 2 may be ATM endpoint nodes, ATM switches, user network interface nodes or other processing systems utilizing the ATM communication protocols. Thus, the present invention is not limited to use in ATM switches but may be utilized in any devices complying with ATM standards.

When a request by a user to access the ATM network of FIG. 2 is made, for example, to node 20, the node evaluates whether the cost of service parameters of the request may be met by a route through the ATM network before the connection request is accepted. Thus, for example, if a request is made for a connection between node 20 and node 24, node 20 would evaluate the status of connections at node 20, node 22, and node 24 to determine whether to accept the request. Thus, node 20 must have information regarding the connections which already exist through node 22 and node 24. The GCAC function of node 20 will then determine whether the request may be accepted. However, according to the present invention, the information which node 20 needs to have to make the schedulability determination need not be information on every existing connection through the nodes in a route. Thus, according to the present invention, a single set of aggregate information regarding connections in a delay class may be used to make the schedulability determination. These aggregate values may reduce the amount of data broadcast by the nodes in the network and may be determined as discussed below. After accepting a connection, a scheduler at each node sequences cells received by the node to guarantee that the QoS requirements of each connection are met.

Figure 3:
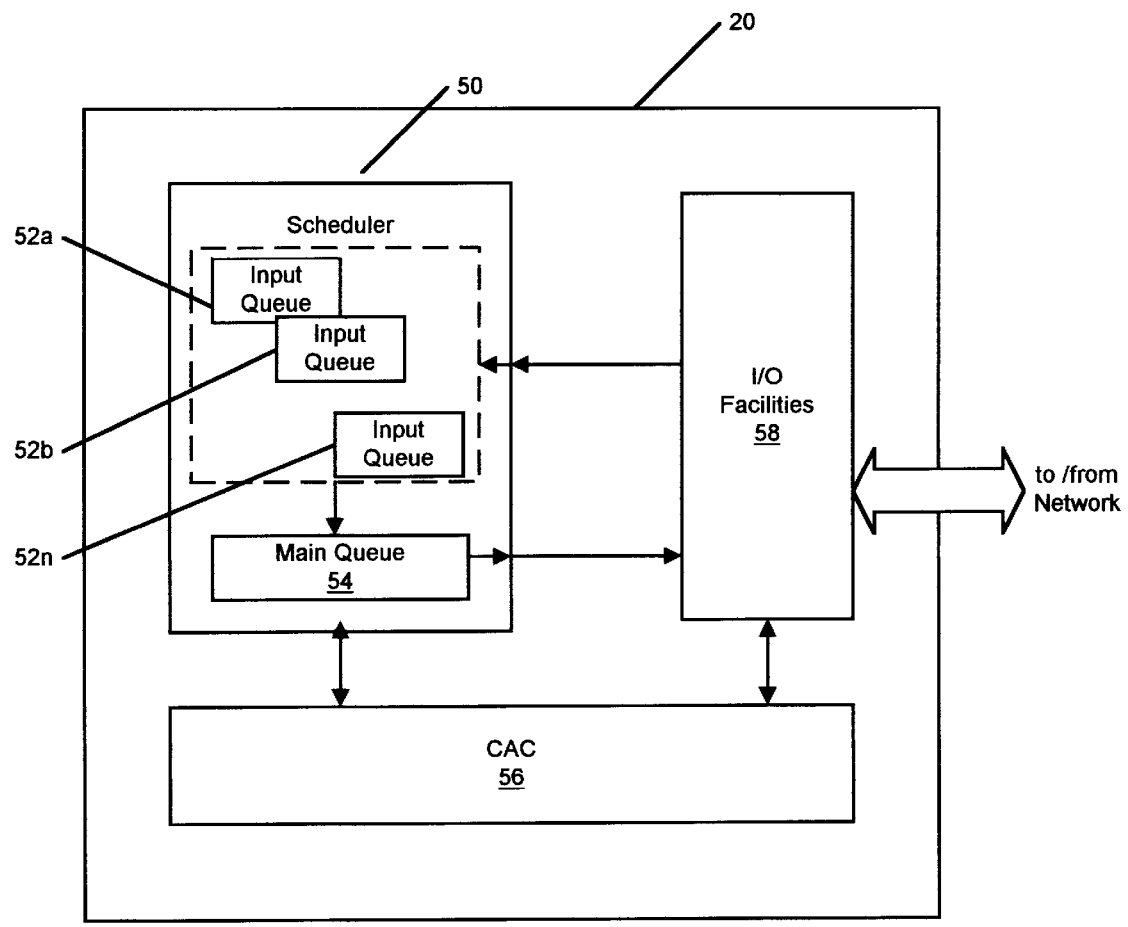
FIG. 3 is a block diagram of an ATM device according to the present invention.

FIG. 3 illustrates one embodiment of an ATM node according to the present invention. As seen in FIG. 3, an ATM node according to the present invention may include a scheduler 50, input queues 52a, 52b through 52n, a main queue 54, a CAC function 56 and input/output capabilities 58. Cells are received and transmitted through the node by the input/output facilities 58. Received cells are placed in the appropriate input queue 52a through 52n by the scheduler 50. Cells that are to be output are moved by the scheduler 50 from the input queues to the main queue 54 for transmission. The CAC function 56 determines whether requests for connections to the node will be accepted (the ACAC function). The CAC 56 also determines a preliminary route for connection requests received by the node which are utilizing the node as an entry point to the ATM network (the GCAC function).

The present invention is described with respect to the nodes and networks of FIG. 2 and FIG. 3; however, as will be appreciated by those of skill in the art, the present invention is applicable to any ATM network configuration. Furthermore, the functions of the present invention may be implemented utilizing a data processing system operating under software control, as dedicated hardware or a combination of the two. Thus, the queues may be implemented as partitions in processing system memory, as FIFO buffer integrated circuits, as locations on a storage device such as a hard disk or other storage media or other such devices known to those of skill in the art.

Figure 4:
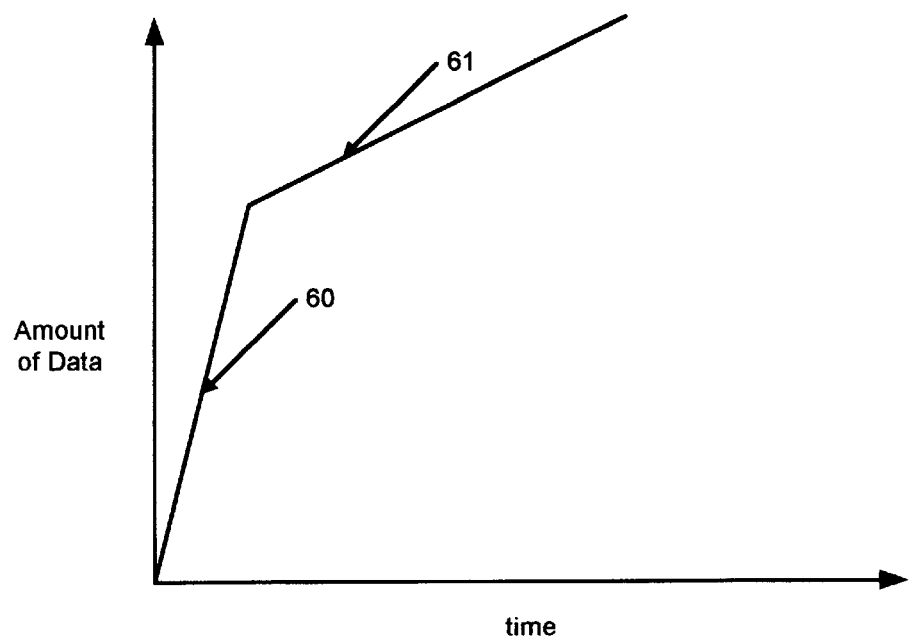
FIG. 4 is a graph illustrating source traffic generation as a function of time for an ATM connection.

In determining schedulability of a connection it is useful to examine the traffic envelope of a connection and multiple connections through a node. Data flow through a connection may be graphed with respect to time to provide a graphic representation of a connection's traffic envelope. The "traffic envelope" $A_i(t)$ of a connection i, such as is illustrated in FIG. 4, is defined as the maximum amount of traffic that connection i is allowed to send in time t. The traffic envelope from time 0 to time t may be defined as:

$$A_i(t) = \min\{c_i t, \sigma_i + \rho_i(t)\}$$

where $c_i$ is the connection peak data rate, $\sigma_i$ is the maximum burst size and $\rho_i$ is the maximum sustainable data rate. Such a connection conforms to the output of two leaky buckets with parameters $(c_i, 0)$ and $(\sigma_i, \rho_i)$.

FIG. 4 illustrates a graph of the amount of data versus time for an ATM connection. As seen in FIG. 4, the maximum amount of data through a connection increases with time at a first rate for a first portion 60 where the slope of the first portion is equal to the connection peak data rate. Eventually, however, a flow control mechanism takes over and through a leaky bucket, a credit based or adaptive rate based mechanism, the rate at which data may be presented by the connection is reduced to the capacity serviced by the EDF scheduler (the second portion of the curve 61 graphed in FIG. 4).

A connection with a traffic envelope of A(t) and a delay guarantee of D may be characterized by the parameters c, σ, ρ and D and may be referred to as a (c, σ, ρ, D) connection. By knowing the traffic envelope of connections, a node may carry out the GCAC function or the ACAC in determining whether a connection request should be accepted. Thus, in a conventional ATM network this traffic envelope information would be broadcast for each connection to other nodes in the network.

Figure 5:
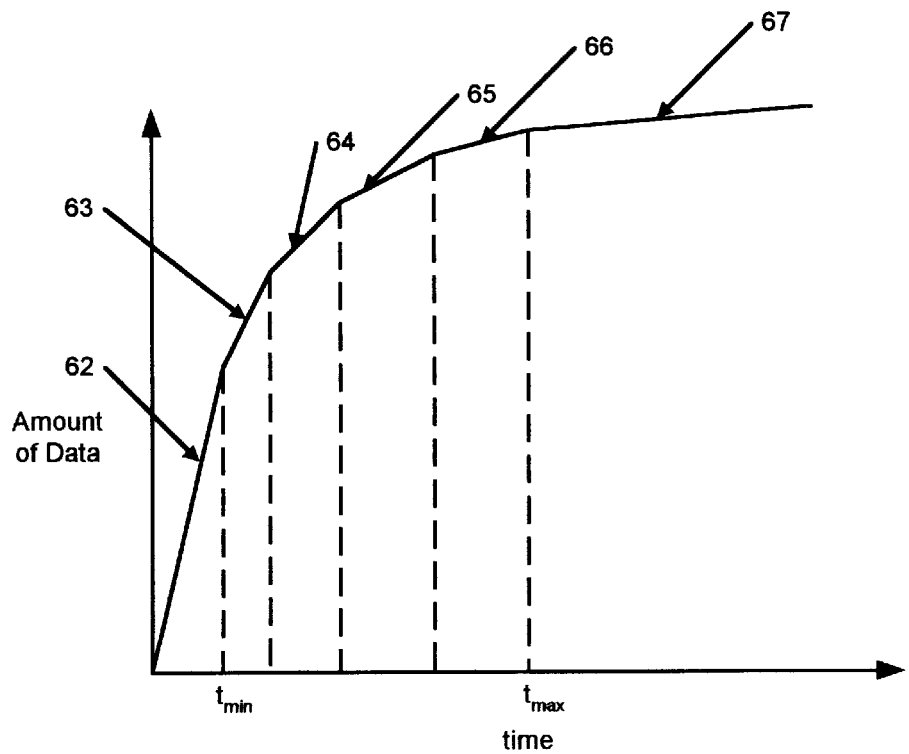
FIG. 5 is a graph illustrating source traffic generation for multiple connections through an ATM node.

As more connections are established through a node, the amount of data through the node over time appears as is illustrated in FIG. 5. FIG. 5 illustrates a traffic envelope for five separate connections through a node. As is seen in FIG. 5 there are six line segments to the graph 62, 63, 64, 65, 66 and 67 which define the traffic envelope for the five connections through the node. Note that while five "knees" to the curve are illustrated in FIG. 5, two or more of the connections have simultaneous inflection points where the rate changes from the peak rate for the connection, then fewer knees may result.

In order to determine if an earliest deadline first scheduler can guarantee the delays associated with each of N connections the CAC function performs a schedulability check. This schedulability check conventionally may be conducted by checking N constraints expressed as a function of c, σ, ρ and D values of the N connections as follows:

$$\sum_{i=1}^{k} \sigma_i \leq D'\left(r - \sum_{i=k+1}^{N} \rho_i\right) + \sum_{i=1}^{k} \sigma_i D_i - \sum_{i=k+1}^{N} c_i(D'_k - D_i)^+, 1 \leq k \leq N$$

where $$D'_i \equiv D_i + \frac{\sigma_i}{c_i - \rho_i}$$

where $c_i \neq \rho_i$ and $D'_i = D_i$ for $c_i = \rho_i$ and where $(x)^+$ denotes max(x,0). Further details on the schedulability check are provided in L. Georgiadis, R. Geurin and A. Parekh, "Optimal Multiplexing on a Single Link: Delay and Buffer Requirements," Proc. IEEE INFOCOM '94, 1994. If the above inequality is satisfied then the connection is accepted.

This conventional procedure typically requires that each node obtain the c, σ, ρ and D values of all active connections over each link in the network to allow calculation of a traffic envelope such as that illustrated in FIG. 5. If this information is available, the CAC mechanism at the entry point switch would check every link along the route selected by the path selection algorithm to determine the worst case delay that can be guaranteed by each switch in the new connection. Thus, the CAC mechanism makes sure that the sum of the worst case delays at each node on the selected route is less than the delay value requested by the connection.

However, unlike typical ATM nodes, ATM nodes according to the present invention do not transmit information on every connection associated with the node. Instead, ATM nodes according to the present invention aggregate characteristics of connections on a per class basis. The aggregate characteristics are then transmitted to other nodes for use in the GCAC function. Use of the aggregate characteristics for a connection delay class assures that connections will not be established through an ATM node which cannot be properly serviced by the EDF scheduler of the node.

Figure 6:
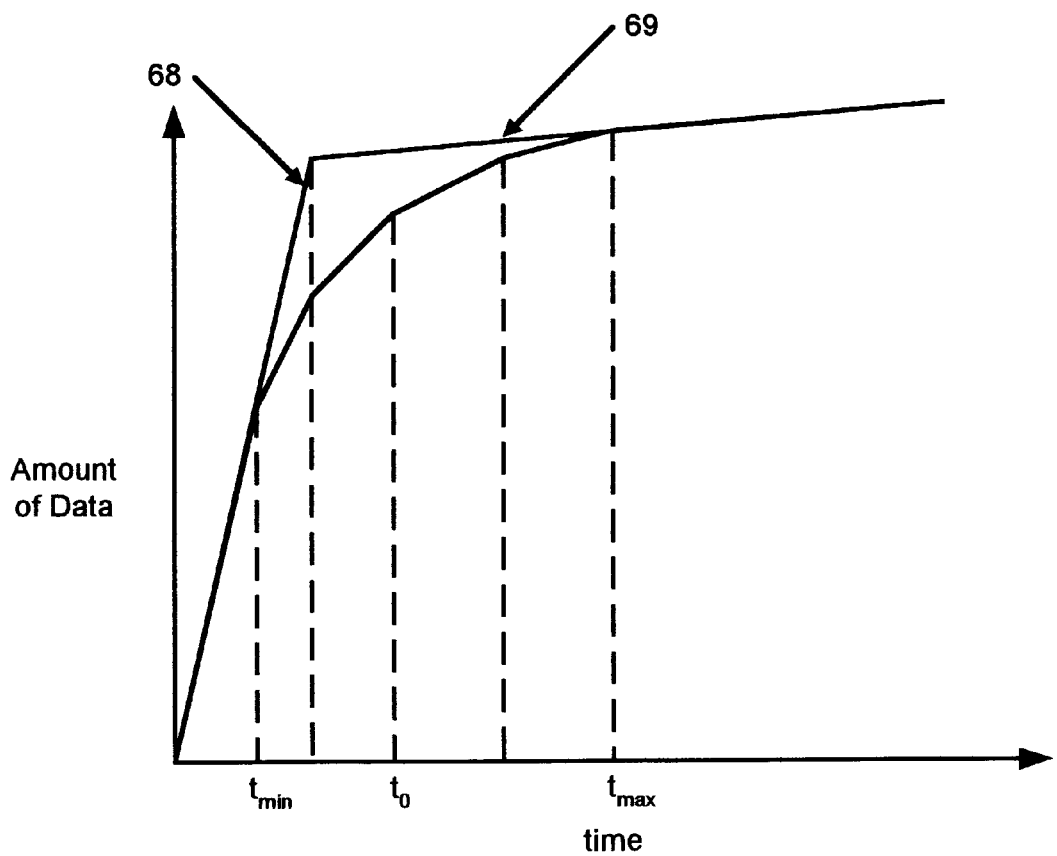
FIG. 6 is a graph illustrating an aggregate super-connection of multiple connections through an ATM node according to the present invention.

The aggregation of connection information in a delay class is illustrated by the graph of FIG. 6. By summing the characteristics of connections within a delay class a single "super-connection" having a traffic envelope illustrated by line segments 68 and 69 may be created. As is seen in FIG. 6, the super connection conservatively estimates the traffic envelope of the multiple connections in a delay class such that if a new connection would pass the schedulability test utilizing the super-connection to characterize the traffic through the node, then the new connection would also pass the schedulability test utilizing the individual connection information. Accordingly, rather than transmitting the connection data for each connection, the present invention transmits only the super-connection information for a delay class. Thus, pursuant to the teachings of the present invention, all that need be broadcast is the aggregate peak data rate ($c_0$), the aggregate maximum burst size ($\sigma_0$) and the aggregate maximum sustainable data rate ($\rho_0$) for each class of connection through a node. The amount of data may be further reduced if it is assumed that the connections in a delay class have infinite peak rates. However, such an assumption would cause the first line segment 68 of FIG. 6 to correspond to the vertical axis which may unduly restrict accepting new connections.

Figure 7:
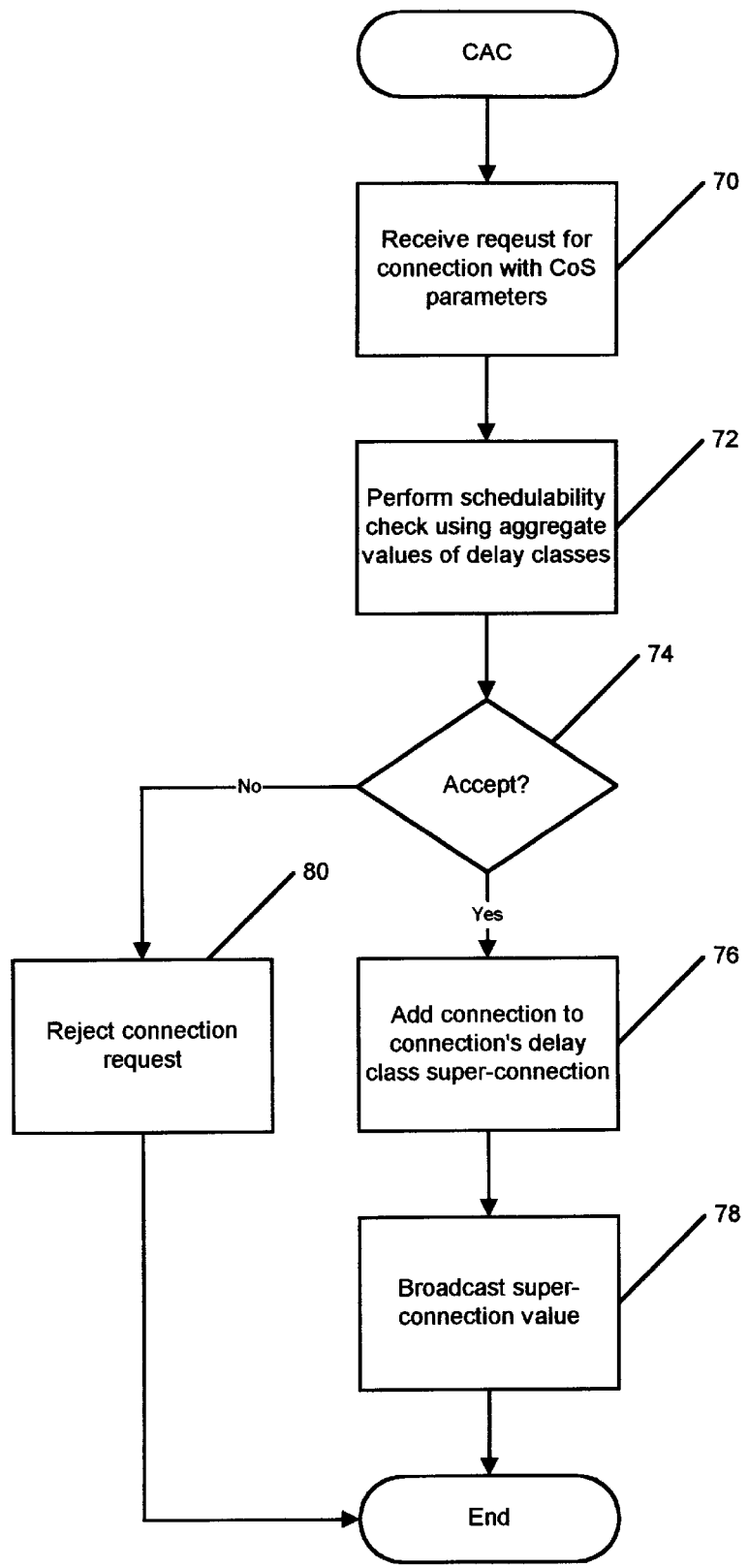
FIG. 7 is a flowchart illustrating the aggregation and broadcast of connection information by an ATM node according to one embodiment of the present invention.

Use of the present invention will now be described with reference to FIG. 7 which is a flowchart illustrating operation of the aggregate connection information aspects of the present invention. As seen in FIG. 7, a request for a connection is first received by an ATM node (block 70) such as node 20, 22, 24, 26 or 28 in FIG. 2. The receiving node then performs the schedulability check for the connection utilizing the aggregate values for the delay classes of connections through the node (block 72). If the new connection passes the schedulability check then the connection is accepted (block 74) and the new connection is added to the delay class super-connection for the accepting node (block 76). The new super-connection information is then broadcast as the aggregate values for the delay class (block 78). If the new connection does not pass the schedulability check (block 74) then the connection is rejected by the node (block 80).

Connections may be divided into delay classes based upon any number of characteristics of the connection, such as connection type (voice, data, video, constant bit rate, variable bit rate, maximum delay, average delay, bandwidth, etc.). Connections within a class may then be aggregated by summing the characteristics of the connections. Thus, the class super-connection characteristics would be as follows:

$$c_o = \sum_{i=1}^{N_o} c_i;$$

$$\sigma^o = \sum_{i=1}^{N_o} \sigma_i;$$

$$\rho_o = \sum_{i=1}^{N_o} \rho_i;$$

where $N_0$ is the number of connections in the delay class. These three characteristics $c_0$, $\sigma_0$ and $\rho_0$ may then be distributed to other ATM nodes instead of each of the characteristics of each of the connections in the class.

The aggregate values may be used to perform the schedulability check utilizing the above described procedure except that, rather than utilizing data from all connections, super-connection data is utilized for all classes. Thus, the amount of data required to do the schedulability check is reduced from N times the data values (3 values) to K times the number of data values where K is the number of delay classes and is typically much smaller than N (the total number of connections) While FIG. 7 illustrates the ACAC function of a node, the aggregate values also benefit the GCAC functions of a node. In such a case, the blocks 76 and 78 would be revised to reflect that, if the total route schedulability check is passed for a route through the network, the request is accepted by the node and the establishment of the connection is begun. The total route schedulability check is performed using the aggregate class information received from nodes in the network rather than individual connection information. Accordingly, not only does the use of the aggregate class information reduce the amount of data which needs to be transmitted between nodes but it also reduces the amount of calculations done by a node in evaluating a route.

Once it has been determined that a connection may be accepted by an ATM node, it is then the function of the ATM nodes to assure that the QoS requirements of the connection are met. Such a task may be accomplished by a second aspect of the present invention, the EDF scheduler. The operation of the EDF scheduler 50 will now be described with reference to FIG. 8, which illustrates a queue configuration for the scheduler 50, and FIGS. 9 and 10 which are flowcharts illustrating the operation of various aspects of the scheduler 50.

Figure 9:
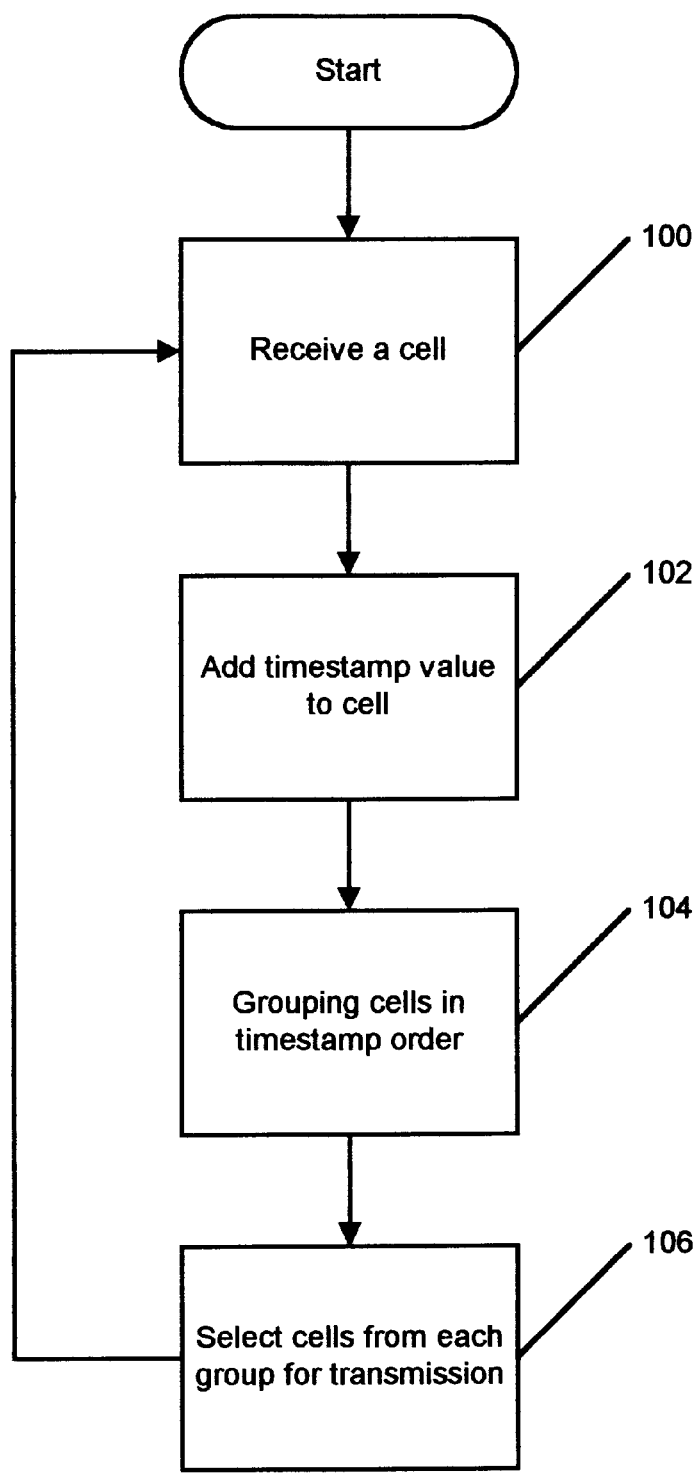
FIG. 9 is a flowchart illustrating the operations of an ATM node utilizing an EDF scheduler according to the present invention.

As seen in FIG. 9, a cell is received (block 100) by an ATM node such as node 20, 22, 24, 26 or 28. A timestamp is associated with the cell (block 102). The timestamp is preferably the sum of the arrival time of the cell at the scheduler 50 and the delay guarantee associated with the connection to which the cell belongs. Cells may then be grouped by common characteristics such as connection or delay value such that the cell with the lowest timestamp value (i.e. the earliest deadline) is first in the group and cells with higher timestamp values follow (i.e. sorted in timestamp order). Cells with the lowest timestamp values from each group may then be selected for transmission before other cells in the group (block 104 and 106) so as to transmit the cells within a group in EDF order. Thus, an earliest deadline first schedule may be maintained.

Figure 8:
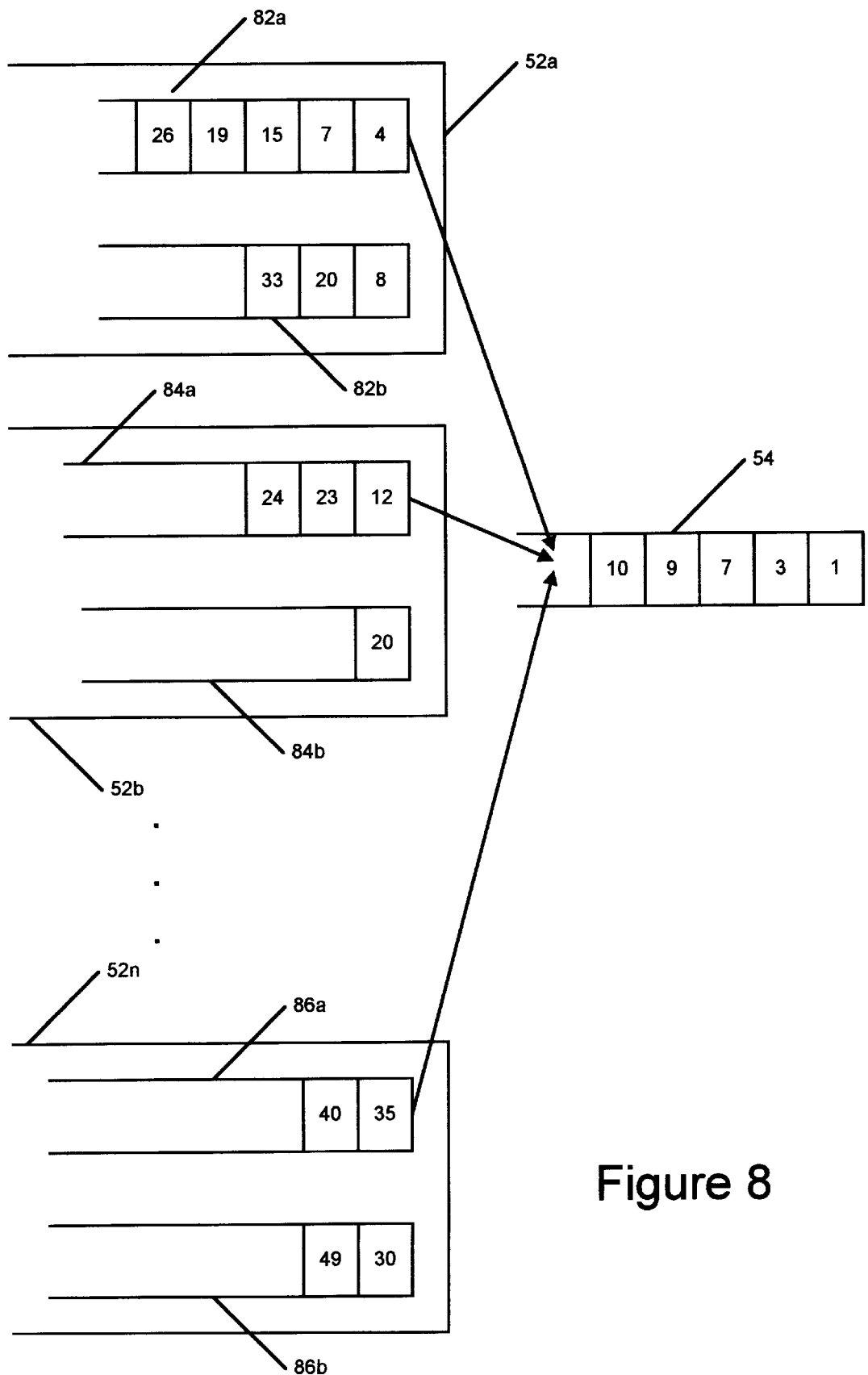
FIG. 8 is a block diagram illustrating operation of an EDF scheduler according to the present invention.
Figure 10:
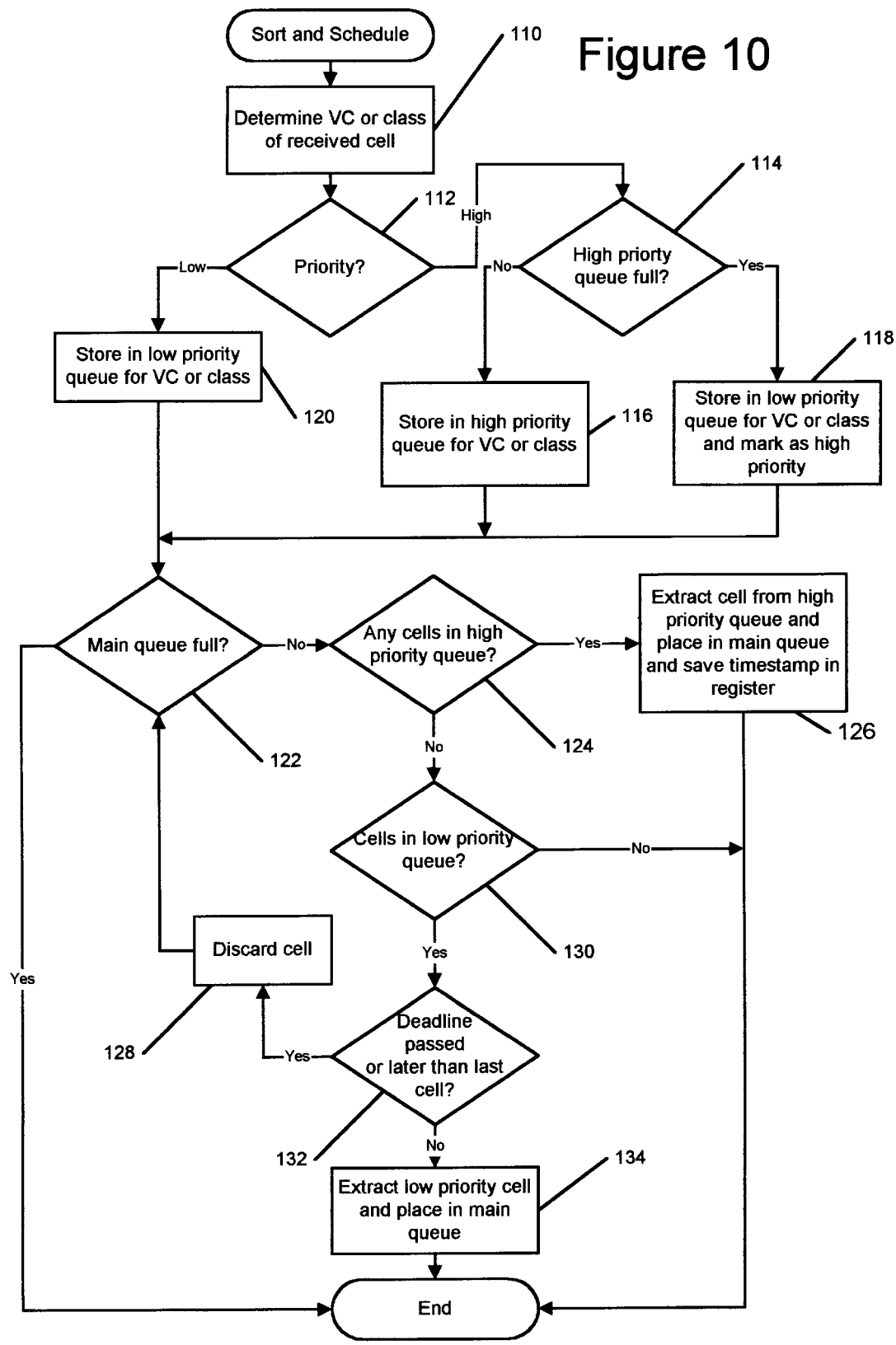
FIG. 10 is a flowchart illustrating the operations of an ATM node utilizing a particular embodiment of an EDF scheduler according to the present invention.

FIGS. 8 and 10 illustrate a further aspect of the present invention where input queues are utilized to group and order received cells and where low priority cells (i.e. cells with the CLP bit set to 1) are taken into consideration. As seen in FIG. 8, a scheduler 50 according to the present invention may utilize a number of input queues 52*a* through 52*n*. The cells illustrated in FIG. 8 are shown with their respective timestamps indicated in each cell. Thus, for example, the earliest deadline cell in queue 52*a* has a timestamp of "4." Preferably the number of input queues correspond to either the number of earliest deadline first connections through the node (per connection scheduler) or the number of classes associated with connections through the node (per class scheduler). In any event, the number of input queues is not limited to the three queues illustrated in FIG. 8. Whether the queues are associated with cells on a per connection or a per class basis, the input queues are subdivided into a queue for high priority cells (CLP=0) 82*a*, 84*a* and 86*a*, and a queue for low priority cells (CLP=1) 82*b*, 84*b*, and 86*b*.

Cells are placed in the input queues in the order in which they are received and, therefore, are maintained in an earliest deadline first order within the input queues. Accordingly, FIFO buffers may be suitable for use as input queues 52*a*, 52*b* and 52*n*. Cells are moved from the input queues 52*a*, 52*b* and 52*n* to a main queue 54 in the order in which they are to be transmitted from the node. Cells are then removed from the main queue 54 in a first-in-first-out order and transmitted onto a communication link, through, for example, input/output facilities 58. Thus, if the cells are placed in the main queue 54 in earliest deadline first order, they will be scheduled for transmission in earliest deadline first order.

The transfer of cells into and out of the input buffers 52*a*, 52*b* and 52*n* and into the main queue 54 (blocks 104 and 106) so as to provide the earliest deadline first scheduler is illustrated in FIG. 10. The scheduler 50 divides the cells into queues based on either the virtual connection of the cell or the delay class of the cell. In either case the overall operation of the scheduler is the same with the difference being the criteria for grouping incoming and outgoing cells into the queues of the scheduler. Operation of the scheduler 50 is described with respect to both the per connection grouping and the per delay grouping, however, preferably only one grouping system should be employed by a scheduler at any given time.

As seen in FIG. 10, after receiving and timestamping a cell, the cell is examined to determine either the delay class of the cell (per class operation) or the virtual connection associated with the cell (per connection operation) (block 110). The CLP bit of the cell is then examined and if set to "0" the high priority path from block 112 is taken and if set to "1" the low priority path is taken.

If the high priority path is taken, then the scheduler 50 checks to see if the high priority queue for the virtual connection or the delay class associated with the cell is full (block 114). If the high priority queue is not full then the cell is stored in the appropriate high priority queue (block 116). If, however, the high priority queue for the connection or the delay category is full the cell is stored in the low priority queue for the cell and that portion of the queue is marked as containing a high priority cell which should not be discarded (block 118). If the low priority queue is also full the high priority cell may displace a cell in the low priority queue as cells in the low priority queue may be discarded. As will be appreciated by those of skill in the art, such a marking operation may be implemented utilizing pointers or linked lists to implement the FIFO buffers of the input queues. Thus, through manipulation of pointers the high and low priority queues may be selectively merged to increase the apparent size of the high priority queue.

After appropriately storing the incoming cell, the scheduler 50 may check the main queue 54 to determine if the main queue 54 is full (block 122). If the main queue is full, the scheduler 50 must wait for data to be removed from the main queue 54 to move data from the input queues to the main queue 54. However, if the main queue 54 is not full, then the scheduler 50 checks to see if there are any cells in any of the high priority input queues (block 124). If high priority cells are present the scheduler extracts the first cell from a high priority queue, places the cell in the main queue 54 and saves the timestamp of the moved cell in a register corresponding to the connection or class of the input queue from which the cell was extracted (block 126).

Because the incoming cells are stored in the input queues in the order they are received and because all of cells in an input queue have common characteristics such as connection or delay class, the cells are stored in the input queue in timestamp order and the sequence of cells for a connection is maintained. However, to achieve such a result, the cells from a given connection should all go to the same input queue. Accordingly, whatever criteria is used to group the cells should provide sufficient repeatability to assure that all cells from a given connection are stored in the same input queue. By extracting the cells from the input queues in the order they are stored, the cells are extracted in EDF order.

The queue from which a high priority cell is extracted for inclusion in the main queue may be selected based on a round-robin or weighted round-robin fashion with each high priority queue having a cell placed in the main queue in sequence if a high priority cell is available. Multiple cells may be moved from a single queue if a weighted round-robin scheme is utilized. Such a weighting may be based on guaranteed bandwidths of a connection or other performance characteristics of the connection or delay class.

If all of the high priority cells have been moved to the main queue 54, the scheduler 50 then looks to see if there are any cells in low priority queues (block 130). If there are no low priority cells, then there are no EDF cells to schedule and other traffic, such as Available Bit Rate (ABR) traffic may be transmitted by the node.

However, if low priority cells are present, the scheduler 50 utilizes the stored timestamps of the last high priority cells to be placed in the main queue 54 to evaluate the low priority cells (block 132). If the timestamp of a cell at the head of a low priority queue has passed or if the timestamp value is less than the timestamp value of the last cell from the corresponding high priority queue, then the cell is discarded (block 128) and the evaluation process begun again. However, if the timestamp of a cell indicates that its deadline has not passed and that the last high priority cell from the connection or class associated with the low priority queue did not have a higher timestamp, then the cell is placed in the main queue (block 134). As with the high priority queues, the low priority queues may have cells extracted in a round-robin or weighted round-robin fashion. By discarding cells with deadlines that have passed or with lower deadlines than cells that have already been scheduled for transmission, the scheduler 50 may maintain the sequence of cells as they are received.

If per connection queuing is utilized, the present invention may determine the connection of a cell from the header of the cell (see FIG. 1). If per class queuing is utilized, the same classes as are utilized for aggregation of parameters for the CAC function may be utilized. Thus, a single set of class criteria may be utilized for both the acceptance of connections and the scheduling of cells for a connection. Alternatively, different classes may be utilized. Suitable classes for use in scheduling of cells include constant bit rate connections, real-time variable bit rate connections, non-real-time variable bit rate connections, available bit rate connections and unspecified bit rate connections.

While the present invention is described with respect to connection acceptance and scheduling, the combination of techniques of acceptance of connections and scheduling provides improved reliability in meeting the QoS requirements of a connection. Thus, the combination of aggregation of connection parameters in determining connection acceptance and the queuing scheduler of the present invention may be utilized to further improve the performance, efficiency and reliability of an ATM network.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of scheduling ATM cells from different connections at an ATM node in earliest deadline first order, the method comprising the steps of:

associating a timestamp value with each cell as it is received by the ATM node;

grouping received cells into a plurality of cell groups in timestamp order based upon delay class characteristics of the cells; and selecting cells from each group so as to transmit the cells in earliest deadline first order.

2. A method according to claim 1, wherein said grouping and said selecting steps comprise the steps of:

providing a plurality of high-priority first-in-first-out buffers;

providing a plurality of low-priority first-in-first-out buffers wherein each low-priority first-in-first-out buffer corresponds to a high-priority first-in-first out buffer;

providing a main queue first-in-first-out buffer;

determining for the received cell whether the received cell is a high-priority cell or a low-priority cell;

distributing the received cell to one of a first-in-first-out buffer associated with the received cell, wherein the received cell is stored in a low-priority first-in-first-out buffer if said determining step determines that the received cell is a low priority cell and the received cell is stored in a high-priority first-in-first-out buffer if said determining step determines that the received cell is a high-priority cell;

extracting from the plurality of high-priority first-in-first-out buffers the first cell in each high-priority first-in-first-out buffer and storing the cells in the main queue first-in-first-out buffer; and repeating said extracting step until all high-priority first-in-first-out buffers no longer contain cells.

3. A method according to claim 2, wherein said repeating step is followed by the steps of:

extracting from the plurality of low-priority first-in-first-out buffers cells the first cell in each low priority first-in-first-out buffer;

storing an extracted cell in the main queue first-in-first-out buffer if the timestamp of the cell indicates that the deadline for the cell has not passed and that the timestamp of the cell is later than the last cell stored in the main queue from the high-priority first-in-first-out buffer corresponding to the low-priority first-in-first-out buffer from which the cell was extracted.

4. A method according to claim 3, further comprising the step of discarding the extracted low-priority cell if the deadline for the cell has passed or the timestamp of the cell is earlier than the last cell stored in the main queue from the high-priority first-in-first-out buffer corresponding to the low-priority first-in-first-out buffer from which the cell was extracted.

5. A method according to claim 2, wherein the first-in-first-out buffers are associated with received cells based upon the virtual connection of the received cells.

6. A method according to claim 5, wherein said step of providing a plurality of high-priority first-in-first-out buffers provides a high-priority first-in-first-out buffer corresponding to each earliest deadline first virtual connection associated with the ATM node and wherein said step of providing a plurality of low-priority first-in-first-out buffers provides a low-priority first-in-first-out buffer for each earliest deadline first virtual connection associated with the ATM node.

7. A method according to claim 2, wherein the first-in-first-out buffers are associated with received cells based upon a delay class associated with the received cells.

8. A method according to claim 7, wherein said step of providing a plurality of high-priority first-in-first-out buffers provides a high-priority first-in-first-out buffer corresponding to each delay class associated with the ATM node and wherein said step of providing a plurality of low-priority first-in-first-out buffers provides a low-priority first-in-first-out buffer for each delay class associated with the ATM node.

9. A method according to claim 2, further comprising the steps of:

determining if the high-priority first-in-first-out buffer associated with a received high-priority cell is full; and storing the received high-priority cell in the low priority first-in-first-out buffer associated with the received high-priority cell.

10. A method according to claim 1, wherein the timestamp value comprises the sum of the arrival time of the cell and the delay guarantee of the cell.

11. A method according to claim 1, wherein said step of selecting is followed by the step of transmitting received cells to other ATM nodes in the order the cells are selected.

12. A system for scheduling ATM cells from different connections at an ATM node in earliest deadline first order comprising:

means for associating a timestamp value with each cell as it is received by the ATM node;

means for grouping received cells into a plurality of cell groups in timestamp order based upon delay class characteristics of the cells; and means for selecting cells from each group so as to transmit the cells in earliest deadline first order.

13. A system according to claim 12, wherein said means for grouping and said means for selecting comprise:

a plurality of high-priority first-in-first-out buffers;

a plurality of low-priority first-in-first-out buffers wherein each low-priority first-in-first-out buffer corresponds to a high-priority first-in-first out buffer;

a main queue first-in-first-out buffer;

means for determining for the received cell whether the received cell is a high-priority cell or a low-priority cell;

means for distributing the received cell to one of a first-in-first-out buffer associated with the received cell, wherein the received cell is stored in a low-priority first-in-first-out buffer if said means for determining determines that the received cell is a low priority cell and the received cell is stored in a high-priority first-in-first-out buffer if said means for determining determines that the received cell is a high-priority cell;

means for extracting from the plurality of high-priority first-in-first-out buffers the first cell in each high-priority first-in-first-out buffer and storing the cells in the main queue first-in-first-out buffer; and means for causing said means for extracting to extract cells until all high-priority first-in-first-out buffers no longer contain cells.

14. A system according to claim 13, further comprising:

means for extracting from the plurality of low-priority first-in-first-out buffers cells the first cell in each low-priority first-in-first-out buffer;

means for storing an extracted cell in the main queue first-in-first-out buffer if the timestamp of the cell indicates that the deadline for the cell has not passed and that the timestamp of the cell is later than the last cell stored in the main queue from the high-priority first-in-first-out buffer corresponding to the low-priority first-in-first-out buffer from which the cell was extracted.

15. A system according to claim 14, further comprising means for discarding the extracted low-priority cell if the deadline for the cell has passed or the timestamp of the cell is earlier than the last cell stored in the main queue from the high-priority first-in-first-out buffer corresponding to the low-priority first-in-first-out buffer from which the cell was extracted.

16. A system according to claim 13, further comprising:
means for determining if the high-priority first-in-first-out buffer associated with a received high-priority cell is full; and
means for storing the received high-priority cell in the low priority first-in-first-out buffer associated with the received high-priority cell.

17. A system according to claim 13, wherein the first-in-first-out buffers are associated with received cells based upon the virtual connection of the received cells and wherein said plurality of high-priority first-in-first-out buffers comprises a high-priority first-in-first-out buffer corresponding to each earliest deadline first virtual connection associated with the ATM node and wherein said plurality of low-priority first-in-first-out buffers comprises a low-priority first-in-first-out buffer for each earliest deadline first virtual connection associated with the ATM node.

18. A system according to claim 13, wherein the first-in-first-out buffers are associated with received cells based upon a delay class associated with the received cells and wherein said plurality of high-priority first-in-first-out buffers comprise a high-priority first-in-first-out buffer corresponding to each delay class associated with the ATM node and wherein said plurality of low-priority first-in-first-out buffers comprise a low-priority first-in-first-out buffer for each delay class associated with the ATM node.

19. A system according to claim 12, wherein the timestamp value comprises the sum of the arrival time of the cell and the delay guarantee of the cell.

20. A system according to claim 12, further comprising means for transmitting received cells to other ATM nodes in the order the cells are selected.

21. A computer program product for scheduling ATM cells from different connections at an ATM node in earliest deadline first order comprising:
a computer-readable storage medium having computer-readable program code means embodied in said medium, said computer-readable program code means comprising:
computer-readable program code means for associating a timestamp value with each cell as it is received by the ATM node;
computer-readable program code means for grouping received cells into a plurality of cell groups in timestamp order based upon delay class characteristics of the cells; and
computer-readable program code means for selecting cells from each group so as to transmit the cells in earliest deadline first order.

22. A computer program product according to claim 21, wherein said computer-readable program code means for grouping and said computer-readable program code means for selecting comprise:

computer-readable program code means for providing a plurality of high-priority first-in-first-out buffers;
computer-readable program code means for providing a plurality of low-priority first-in-first-out buffers wherein each low-priority first-in-first-out buffer corresponds to a high-priority first-in-first out buffer;
computer-readable program code means for providing a main queue first-in-first-out buffer;
computer-readable program code means for determining for the received cell whether the received cell is a high-priority cell or a low-priority cell;
computer-readable program code means for distributing the received cell to one of a first-in-first-out buffer associated with the received cell, wherein the received cell is stored in a low-priority first-in-first-out buffer if said computer-readable program code means for determining determines that the received cell is a low-priority cell and the received cell is stored in a high-priority first-in-first-out buffer if said computer-readable program code means for determining determines that the received cell is a high-priority cell;
computer-readable program code means for extracting from the plurality of high-priority first-in-first-out buffers the first cell in each high-priority first-in-first-out buffer and storing the cells in the main queue first-in-first-out buffer; and
computer-readable program code means for causing said computer-readable program code means for extracting to extract cells until all high-priority first-in-first-out buffers no longer contain cells.

23. A computer program product according to claim 22, further comprising:
computer-readable program code means for extracting from the plurality of low-priority first-in-first-out buffers cells the first cell in each low-priority first-in-first-out buffer;
computer-readable program code means for storing an extracted cell in the main queue first-in-first-out buffer if the timestamp of the cell indicates that the deadline for the cell has not passed and that the timestamp of the cell is later than the last cell stored in the main queue from the high-priority first-in-first-out buffer corresponding to the low-priority first-in-first-out buffer from which the cell was extracted.

24. A computer program product according to claim 23, further comprising computer-readable program code means for discarding the extracted low-priority cell if the deadline for the cell has passed or the timestamp of the cell is earlier than the last cell stored in the main queue from the high-priority first-in-first-out buffer corresponding to the low-priority first-in-first-out buffer from which the cell was extracted.

25. A computer program product according to claim 22, further comprising:
computer-readable program code means for determining if the high-priority first-in-first-out buffer associated with a received high-priority cell is full; and
computer-readable program code means for storing the received high-priority cell in the low-priority first-in-first-out buffer associated with the received high-priority cell.

26. A computer program product according to claim 22, wherein the first-in-first-out buffers are associated with received cells based upon the virtual connection of the received cells and wherein said plurality of high-priority first-in-first-out buffers comprises a high-priority first-in-first-out buffer corresponding to each earliest deadline first virtual connection associated with the ATM node and wherein said plurality of low-priority first-in-first-out buffers comprises a low-priority first-in-first-out buffer for each earliest deadline first virtual connection associated with the ATM node.

27. A computer program product according to claim 22, wherein the first-in-first-out buffers are associated with received cells based upon a delay class associated with the received cells and wherein said plurality of high-priority first-in-first-out buffers comprise a high-priority first-in-first-out buffer corresponding to each delay class associated with the ATM node and wherein said plurality of low-priority first-in-first-out buffers comprise a low-priority first-in-first-out buffer for each delay class associated with the ATM node.

28. A computer program product according to claim 21, wherein the timestamp value comprises the sum of the arrival time of the cell and the delay guarantee of the cell.

29. A computer program product according to claim 21, further comprising computer-readable program code means for transmitting received cells to other ATM nodes in the order the cells are selected.

30. A method of controlling scheduling in an ATM node in a network, comprising:

aggregating connection information for connections to an ATM node having a common characteristic to provide a set of aggregate connection information for the ATM node; and distributing the set of aggregate connection information to other ATM nodes in the network in lieu of distributing the connection information, the set of aggregate connection information providing a reduced volume of communications based on the common characteristic so as to reduce bandwidth utilized in distributing connection information between ATM nodes;

accepting connections to the ATM network based on the aggregate connection information;

associating a timestamp value in each cell associated with an accepted connection as it is received by the ATM node;

grouping received cells into a plurality of cell groups in timestamp order based upon characteristics of the cells; and selecting cells from each group so as to transmit the cells in earliest deadline first order.

31. A method according to claim 30, wherein said grouping and said selecting steps comprise the steps of:

providing a plurality of high-priority first-in-first-out buffers;

providing a plurality of low-priority first-in-first-out buffers wherein each low-priority first-in-first-out buffer corresponds to a high-priority first-in-first out buffer;

providing a main queue first-in-first-out buffer;

determining for the received cell whether the received cell is a high priority cell or a low-priority cell;

distributing the received cell to one of a first-in-first-out buffer associated with the received cell, wherein the received cell is stored in a low-priority first-in-first-out buffer if said determining step determines that the received cell is a low-priority cell and the received cell is stored in a high-priority first-in-first-out buffer if said determining step determines that the received cell is a high-priority cell;

extracting from the plurality of high-priority first-in-first-out buffers cells the first cell in each high-priority first-in-first-out buffer and storing the cells in the main queue first-in-first-out buffer; and repeating said extracting step until all high-priority first-in-first-out buffers no longer contain cells.

32. A method according to claim 31, wherein said repeating step is followed by the steps of:

extracting from the plurality of low-priority first-in-first-out buffers cells in timestamp value order the first cell in each low-priority first-in-first-out buffer;

storing an extracted cell in the main queue first-in-first-out buffer if the timestamp of the cell indicates that the deadline for the cell has not passed and that the timestamp of the cell is later than the last cell stored in the main queue from the high-priority first-in-first-out buffer corresponding to the low-priority first-in-first-out buffer from which the cell was extracted.

33. A method according to claim 30, wherein said step of aggregating connection information and said step of distributing the set of aggregate connection information comprise the steps of:

aggregating connection information for connections in each connection class of the ATM node so as to provide a set of aggregate connection for each connection class of the ATM node; and distributing each set of aggregate connection information for each connection class of the ATM node to other ATM nodes in the network.

34. A system for controlling scheduling in an ATM node in a network, comprising:

means for aggregating connection information for connections to an ATM node having a common characteristic to provide a set of aggregate connection information for the ATM node; and means for distributing the set of aggregate connection information to other ATM nodes in the network in lieu of distributing the connection information, the set of aggregate connection information providing a reduced volume of communications based on the common characteristic so as to reduce bandwidth utilized in distributing connection information between ATM nodes;

means for accepting connections to the ATM network based on the aggregate connection information;

means for associating a timestamp value in each cell associated with an accepted connection as it is received by the ATM node;

means for grouping received cells into a plurality of cell groups in timestamp order based upon characteristics of the cells; and means for selecting cells from each group so as to transmit the cells in earliest deadline first order.

35. A computer program product for controlling scheduling in an ATM node in a network, comprising:

a computer-readable storage medium having computer-readable program code means embodied in said medium, said computer-readable program code means comprising:

computer-readable program code means for aggregating connection information for connections to an ATM node having a common characteristic to provide a set of aggregate connection information for the ATM node; and computer-readable program code means for distributing the set of aggregate connection information to other ATM nodes in the network in lieu of distributing the connection information, the set of aggregate connection information providing a reduced volume of communications based on the common characteristic so as to reduce bandwidth utilized in distributing connection information between ATM nodes;

computer-readable program code means for accepting connections to the ATM network based on the aggregate connection information;

computer-readable program code means for associating a timestamp value in each cell associated with an accepted connection as it is received by the ATM node;

computer-readable program code means for grouping received cells into a plurality of cell groups in timestamp order based upon characteristics of the cells; and computer-readable program code means for selecting cells from each group so as to transmit the cells in earliest deadline first order.

* * * * *